United States Patent
Ge et al.

(10) Patent No.: US 11,003,651 B2
(45) Date of Patent: May 11, 2021

(54) DATABASE PARTITION MANAGEMENT SYSTEM

(71) Applicant: Oracle International Corporation, Redwood Shores, CA (US)

(72) Inventors: Jing Ge, Plymouth, MN (US); Allen John Violette, Woodbury, MN (US); Bharath Krishnan Narayanan, Chanhassen, MN (US); Stephen Eck, Lakeville, MN (US)

(73) Assignee: Oracle International Corporation, Redwood Shores, CA (US)

( * ) Notice: Subject to any disclaimer, the term of this patent is extended or adjusted under 35 U.S.C. 154(b) by 190 days.

(21) Appl. No.: 16/202,704

(22) Filed: Nov. 28, 2018

(65) Prior Publication Data

US 2020/0167330 A1    May 28, 2020

(51) Int. Cl.
*G06F 16/22* (2019.01)
*G06Q 10/10* (2012.01)
*G06F 16/23* (2019.01)

(52) U.S. Cl.
CPC ...... *G06F 16/2282* (2019.01); *G06F 16/2365* (2019.01); *G06Q 10/1093* (2013.01)

(58) Field of Classification Search
CPC ............ G06F 16/2282; G06F 16/2365; G06Q 10/1093
See application file for complete search history.

(56) References Cited

U.S. PATENT DOCUMENTS

| | | | |
|---|---|---|---|
| 2009/0182746 A1* | 7/2009 | Mittal | G06F 16/2343 |
| 2013/0080299 A1* | 3/2013 | Dhakephalkar | G06Q 40/02 |
| | | | 705/30 |
| 2014/0095449 A1* | 4/2014 | Marwah | G06F 16/113 |
| | | | 707/668 |
| 2016/0036623 A1* | 2/2016 | Clarkson | G06F 11/3495 |
| | | | 714/4.11 |
| 2016/0092535 A1* | 3/2016 | Kuchibhotla | G06F 16/27 |
| | | | 707/634 |
| 2016/0283503 A1* | 9/2016 | Parikh | G06F 16/2282 |
| 2016/0350392 A1* | 12/2016 | Rice | G06F 16/2282 |
| 2017/0003900 A1* | 1/2017 | Falco | G06F 3/067 |
| 2018/0063265 A1* | 3/2018 | Crossley | G06N 20/00 |
| 2019/0042660 A1* | 2/2019 | Brown | G06F 16/211 |
| 2019/0286839 A1* | 9/2019 | Mutha | G06F 16/29 |

\* cited by examiner

*Primary Examiner* — Cam Y T Truong
(74) *Attorney, Agent, or Firm* — Potomac Law Group, PLLC (57) ABSTRACT

RI/ORASE history and current transaction data are stored in partitioned fact tables and aggregation tables based on business calendar. Most of associated indexes are locally partitioned indexes. In a typical RI customer environment, partitioned transaction data takes 85% or more of overall RI database space. The benefits of partitioning include easy management of data, enhanced performance, and assistance with backup and recovery. A partition management system provides the ability to create initial partitions and manage existing partitions in ways that allow the size of the partitioned database to exceed a backup limit size.

20 Claims, 7 Drawing Sheets

DATABASE PARTITION MANAGEMENT SYSTEM

FIELD

One embodiment is directed generally to a computer system, and in particular a computer system that manages partitions in a database.

BACKGROUND INFORMATION

Certain applications, such as Oracle Retail Merchandising Insights ("RI") and Oracle Retail Application Science Engine ("ORASE"), allow its users to provide data-driven and science-powered insights into a retailer's merchandising performance. These solutions provide analytics that answer what is happening and why; what will happen and why; and how the user can influence what happens. These solutions share a standards-based and retail-specific data model that reflects both functional and technical best practices, thousands of packaged metrics, and hundreds of packaged reports and dashboards. Underlying this functionality can be a cloud-based database. Underlying cloud-based database can be many time-based partitioned tables containing data for various function areas.

Cloud-based environments allow applications to run within and take advantage of the distributed resources provided by a cloud. Such environments can support large numbers of users or tenants, some of which may have specific requirements that are particular to that user or tenant. The management of the database, which would be performed by the user's database administrator in case of a local or native database installation, is not the user's responsibility because of the cloud based configuration. This gives rise to various technical problems which are discussed below, along with technical solutions provided by embodiments of the present disclosure.

SUMMARY

In an embodiment of the present disclosure, time-based partitions of a cloud database are managed by a partition management system. The partition management system may be implemented as a combination of hardware and software. The partition management system may create new partitions, activate the newly created partitions, deactivate/inactivate partitions based on function areas, compress inactive partitions, archive inactive partitions, and purge partitions that have been previously archived, based on configuration rules. The partition management system may apply intelligence to modify and update the configuration rules according to which it learns from the past history. The configuration rules may be based on customer's business requirements. It also may be based on a cloud database backup limit and enable a cloud database to exceed that storage limit without jeopardizing backup service agreement and performance.

DETAILED DESCRIPTION

A system according to disclosed embodiments performs automated management of partitioned database tables. The management can include creating initial partitions for loading of historical data, creating new partitions as the partitions become needed, compressing inactive partitions storing old data, moving inactive partitions to read-only table space, archiving obsolete partitions in the read-only tablespace for offline retention, and purging obsolete partitions from the read-only tablespace. The management process can be automated such that the partitioned database is managed without the involvement of a human administrator.

Both RI and ORASE 110 can generally be considered data intensive data warehouse and business intelligence applications that may include 650 or more tables, of which more than 250 may be time-based partitioned. The data warehouse contains a large volume of current and historical transaction data. This data can be used to generate business reports, perform analysis of the user's transactions to make predictions about future transactions and to shape business strategy based on the predictions. RI is also a central repository of integrated data from many sources over time, and it is understood that data continually accumulates in the repository over the time. In embodiments, RI/ORASE can be deployed in the cloud, such that it utilizes a cloud database system 100, as shown in FIG. 1.

Figure 1:
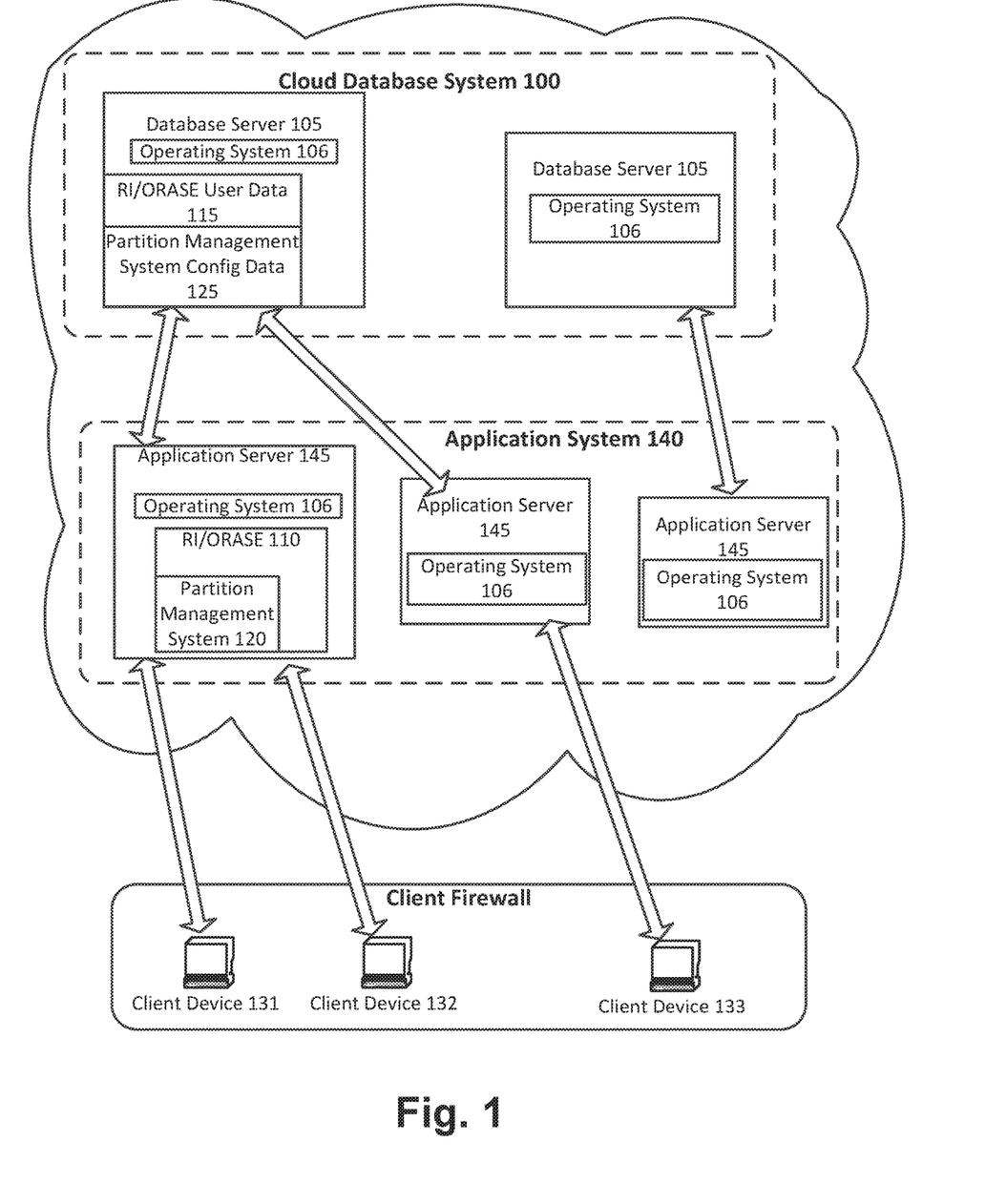
FIG. 1 is a block diagram of a partition management system in a cloud configuration in accordance with an embodiment of the disclosure.

Referring to FIG. 1, cloud configuration for partition management system in accordance with an embodiment of the disclosure contains database system 100 and application system 140. Database system 100 may include multiple database servers 105. RI/ORASE user data 115 including partition management system configuration data 125 is on database server 105. Application system 140 may include multiple application servers 145. RI/ORASE application 110 resides on one or multiple application server 145. Partition management system 120 is part of RI/ORASE application 110. RI/ORASE communicates with the cloud database system 100. The communication is bidirectional, as the RI/ORASE stores data in and retrieves data from the database system 100. A partition management system 120 also communicates with the database system 100, and is described in greater detail below. Still referring to FIG. 1, client devices 131, 132, and 133 interface to the RI/ORASE 110 to obtain intelligence about their retail operations. This intelligence is supported by vast amount of data stored in the database system 100. Because the database system 100 is a cloud database, it is shared among multiple users, with each user owning its own data. To support such logical division of the database, the database may be partitioned.

Figure 2:
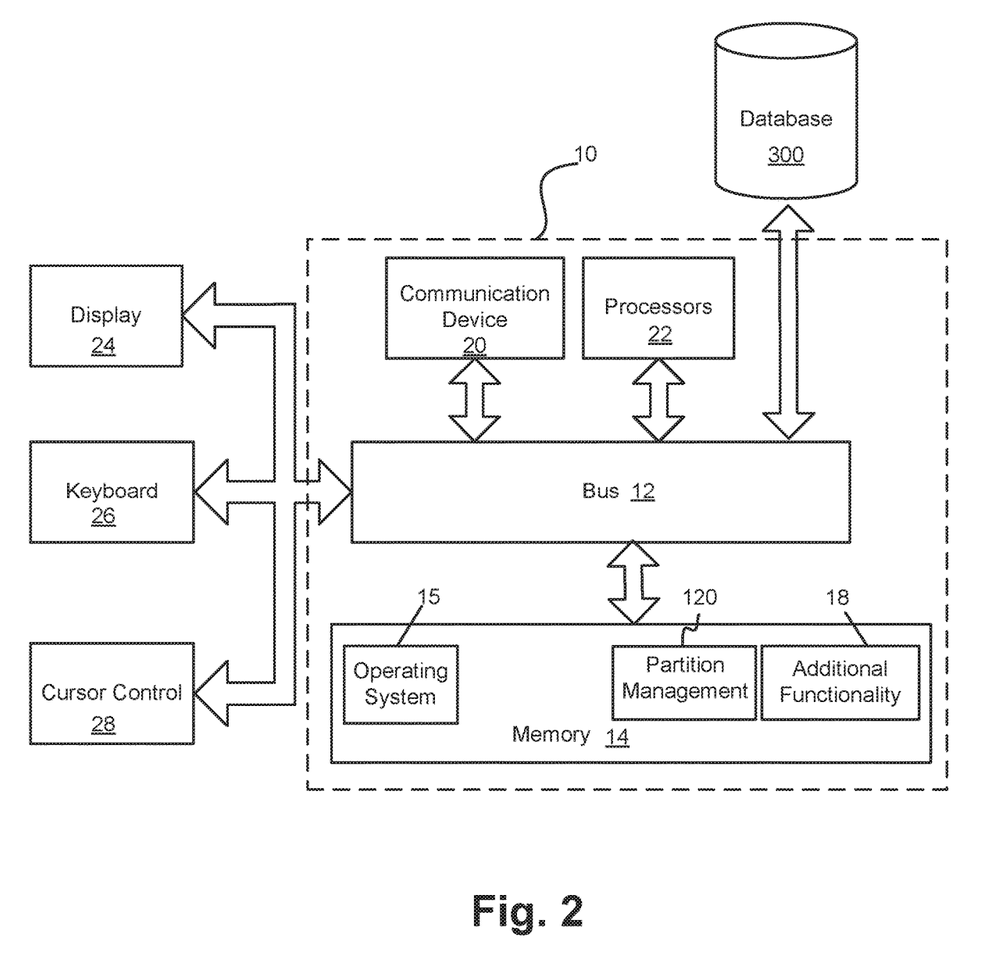
FIG. 2 is a block diagram of a computer server/system in accordance with an embodiment of the disclosure.

FIG. 2 is a block diagram of a computer server/system 10 in accordance with an embodiment of the disclosure. Although shown as a single system, the functionality of system 10 can be implemented as a distributed system, such as in the cloud. System 10 collectively can implement any of the elements of cloud database system 100 of FIG. 1. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 2, such as a keyboard or display.

System 10 includes a bus 12 or other communication mechanism for communicating information, and one or more processors 22 (for simplicity, referred to as processor 22) coupled to bus 12 for processing information. Processor 22 may be any type of a general or a specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a partitions management module 16 that automatically manages partitions in a cloud hosted database, and all other functionality disclosed herein. System 10 can be part of a larger system. Therefore, system 10 can include one or more additional functional modules 18 to include the additional functionality, such as RI or ORASE.

A database 300, which may be a cloud database hosted by the cloud database system 100, is coupled to bus 12 to provide centralized storage for modules 15 and 18 and store customer data, product data, transactional data, etc. The configuration data 140 may also be stored in the database 300. In one embodiment, database 300 is a relational database management system ("RDBMS") that can use Structured Query Language ("SQL") to manage the stored data.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Figure 3A:
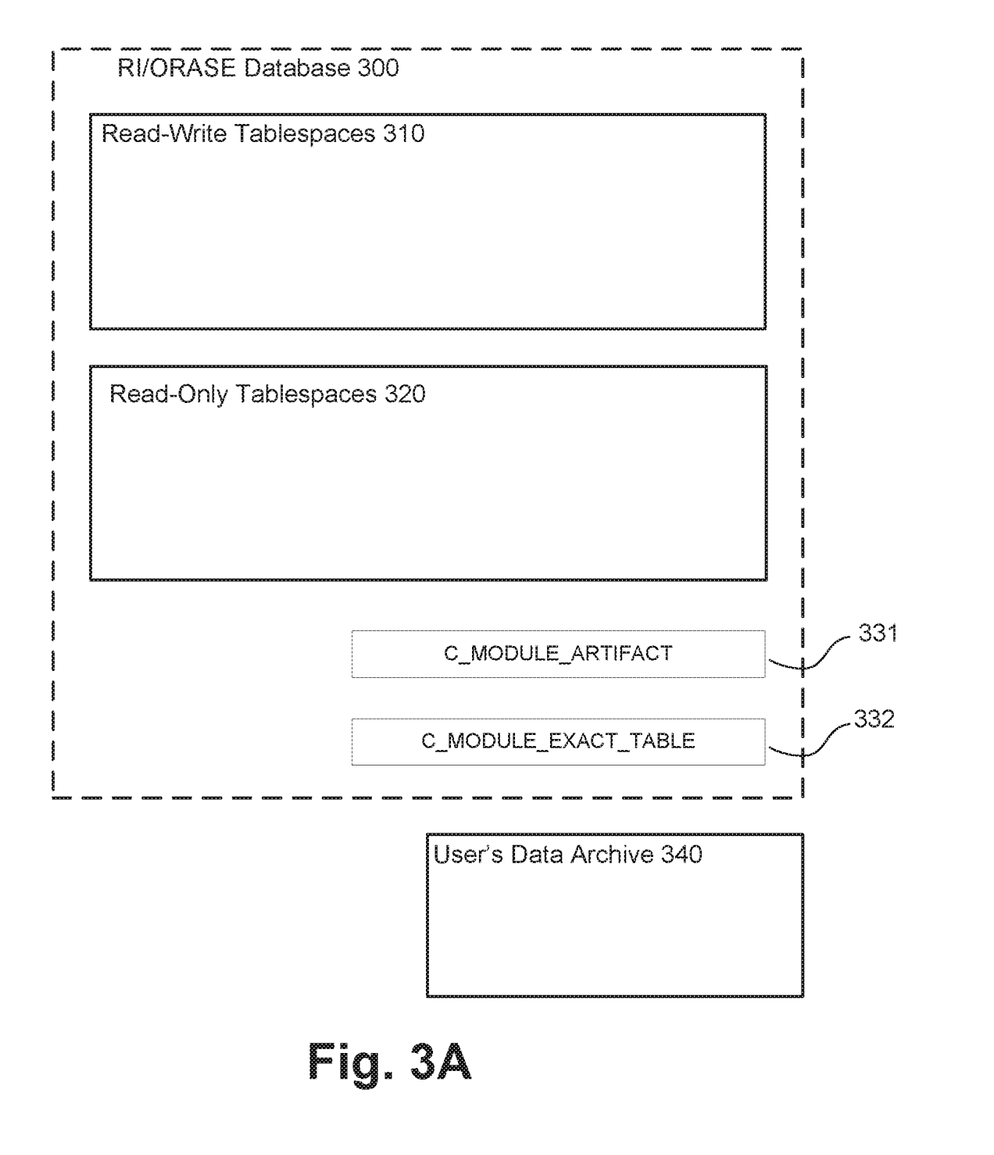
FIGS. 3A, 3B, and 3C illustrate a block diagram of RI/ORASE database structure in accordance with an embodiment of the disclosure.
Figure 3B:
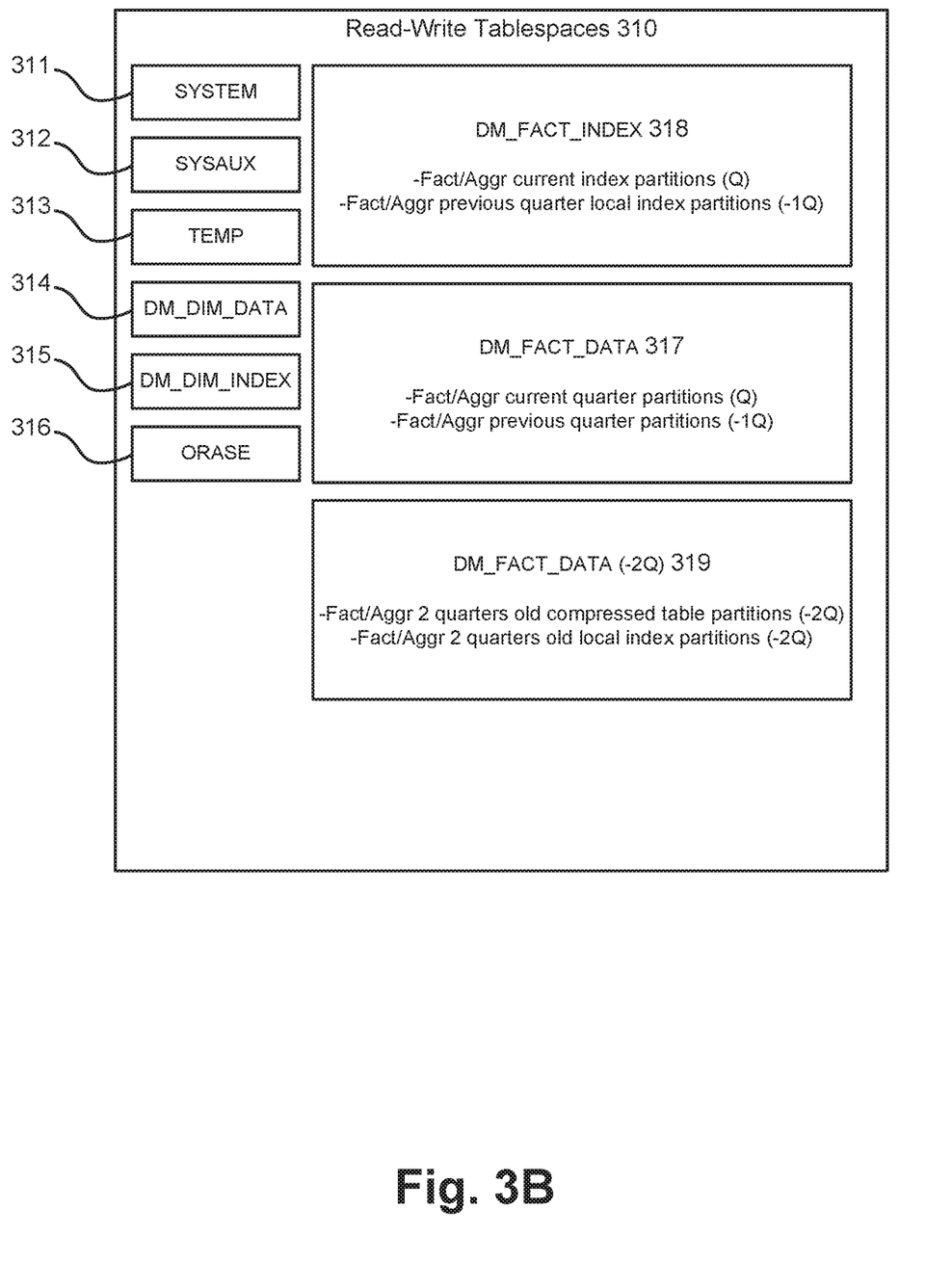
Figure 3C:
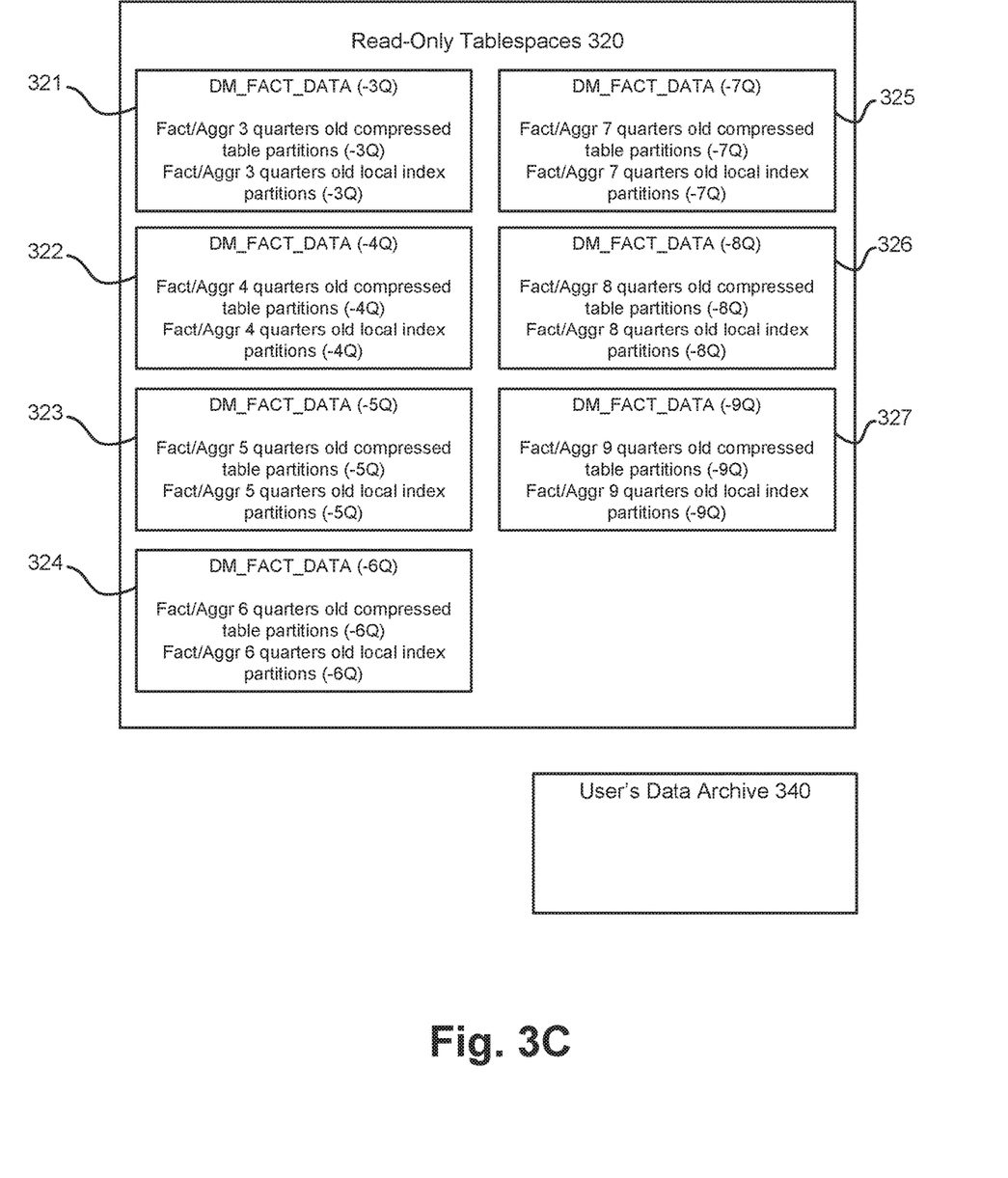

Referring to FIGS. 3A, 3B, and 3C, the cloud data base system 100 hosts one or more databases 300. The database 300 contains read-write tablespaces 310 and read-only tablespaces 320 as shown in FIG. 3A. Read-write tablespaces 310 are tablespace with default read-write attri-bute. They allow data to be written to tables and read from tables in it. On the other hand, the read-only tablespaces 320 contain table partitions that can be read by queries, but no new data can be added or updated. When the database 300 is backed up, the data that is stored in the read-only tablespaces 320 does not need to be backed up after the initial backup, because the data in those tablespaces cannot change due to the read-only attribute.

A tablespace comprises a set of one or more data files that are used to store the data for various types of database objects, such as a table, an index, a table partition or an index partition. If a database object is stored in a tablespace of a particular database, the data dictionary stored in the SYSTEM tablespace (311) maps the database object to the tablespace that holds the data for the database object. Thus, a tablespace is a physical storage where the actual data underlying database objects can be kept. It serves to allocate storage for all DBMS managed segments.

By using tablespaces, an administrator also can control the disk layout of an installation. A common use of tablespaces is to optimize performance. For example, a heavily used index can be placed on a fast solid-state drive ("SSD"). On the other hand, a database table which contains archived data that is rarely accessed could be stored on a less expensive but slower magnetic hard drive.

RI/ORASE history and current transaction data are stored in partitioned fact tables and aggregation tables based on a user's business calendar. Many of the associated indexes are locally partitioned indexes. In most of cases, business calendar is different from standard Gregorian calendar. It is understood that in the cloud configuration, there may be many different users, each with a different business calendar. In a typical RI customer environment, partitioned transaction data takes 85% or more of the overall RI database space. Partitioning of the transaction data may provide improved ease of management of the data, faster database performance when executing queries, and assists in backup and recovery in case of database failure.

FIG. 3B shows database components of RI/ORASE application with partition management system in accordance with an embodiment of the disclosure. The read-write tablespaces 310 represents a group of read-write tablespaces 311-319. The SYSTEM tablespace 311, SYSAUX tablespace 312 and TEMP tablespace 313 are created during database creation. They are mandatory components for database operation and administration. The DM_DIM_DATA tablespace 314 and DM_DIM_INDEX tablespace 315 contain dimension tables and associated indexes. Those dimension tables normally are relatively small in volume and are not partitioned. The ORASE tablespace 316 contains working tables and result tables for ORASE analytics function. The DM_FACT_DATA tablespace 317 stores all active partitions of RI/ORASE fact and aggregation tables up to a configurable threshold for data inactive time. In an embodiment, the current business date is a day in a particular year quarter and the configurable threshold for inactive time is 6 months or two quarters. DM_FACT_DATA tablespace 317 stores data that falls into the most recent quarter and one quarter back. The DM_FACT_INDEX tablespace 318 contains all associated index partitions for data in DM_FACT_DATA tablespace 317. DM_FACT_DATA (−2Q) tablespace 319 illustrates a partition that holds data that is from two quarters back from the current business date and is named as DM_FACT_DATA_Q<YYYYQ> (−2Q). Since the data two quarters back reaches configurable threshold for data inactive time, the data is inactive now, meaning data is available for query but not for update. Partitioned data in DM_FA- CT_DATA_Q20173 (−2Q) 319 is compressed, which reduces the storage size. Associated index partitions are also stored in the same tablespace.

Referring to FIG. 3C, the database 300 also contains group of read-only tablespaces 320, which holds older transaction data, as designated by the name of each tablespace 321-327. "−3Q" refers to three quarters back, and so on. Although only −3Q through −9Q are shown due to configurable threshold for data archive time, it is understood that more or fewer tablespaces can be stored if different threshold for data archive time is configured. Tablespaces 321-327 are read-only tablespaces, and are also compressed.

Referring again to FIG. 3C, a user's data archive 340 is illustrated outside of the database 300. In an embodiment, the archive is a dump file generated by Oracle data pump utility. It is understood that 340 can be a local database controlled by the user, a tape backup, or any other type of storage that is logically separated from the database 300. Thus, the user has full control over archive 340 and can manage any archived data to comply with the user's particular data retention requirements. The archive 340 holds data of read-only tablespace 327, which was previously in the database 300, in the read-only tablespaces 320. The partition 327 is illustrated as holding transaction data going back nine quarters by the "−9Q." Of course, the archive 340 may contain other partitions going back even farther in time. This illustrates that at some point, partitions from the read-only tablespace group 320 are archived in the user's archive 340, and then purged from the database 300.

When an RI/ORASE service is deployed for a new user, the user's existing data is loaded into the RI/ORASE database. This can be a manual process that takes into account the user's prior data storage solution and adapts the user's existing data for import into the RI/ORASE database. The existing data may be historical data that represents past transactions that the user has conducted and that may be used by the RI/ORASE report and analysis process to provide insights to the user about their past business practices.

In addition to the historical transaction data, once the user is live in the RI/ORASE system, new transaction data will be added to the RI/ORASE database 300 daily. The RI/ORASE database will load this new data in addition to the initial historical transaction data.

As noted above, the initial deployment for a new user may be a manual process to ensure that historical transaction data has been properly loaded into the database and that new transaction data can be stored daily in the same format as the historical transaction data. As part of the initial deployment, the database tables storing the transaction data are partitioned.

In an embodiment, the partitioning is horizontal partitioning based on date/time constraints. In an embodiment, the date/time constraints can be based on the user's business calendar. For example, data for each business day can be held in a single partition, data for each business week can be held in a single partition, or data for each quarter (e.g., 3 months of data) can be held in a single partition. as shown in partitions 319 and 321-326. After the initial configuration, the user will accumulate new data in the RI/ORASE database 300. After one quarter, it may be desirable to add a new partition to hold the data for the next business quarter. This can be done manually in case of a local installation of a database.

However, in cloud deployments, there are many users and the responsibility for management of the RI/ORASE database does not rest with the user. This presents a problem, because it is likely that the different users of the RI/ORASE database 300, hosted in the cloud, have different needs and requirements. As the number of users grows, it becomes very labor intensive to manually manage partitions in the cloud databases.

Moreover, the database is in the cloud, and thus data connections are expected through networks of varying throughput and latency. This variability in the connection quality to the cloud database poses challenges for database management. For instance, backing up of the database is limited to a backup size, such as 5 terabytes ("TB"). It is desirable to regularly backup the content of the cloud database system 100 to ensure point-in-time recovery, but the cloud based nature imposes a practical size limit on the backup. This is driven by network throughput limits, the number of databases sharing backup service within the cloud and the amount of time to perform a backup. In an embodiment the backup size limit is 5 TB. Of course, different embodiments may have different backup size limits, but the fact remains that a cloud based database faces a technical problem of constrained backup sizes.

Because of the backup size constraint, the size of the database is likewise constrained. In other words, the size of the cloud based database is artificially limited by the backup size limit. This is an undesirable problem solved by the embodiments described below.

The above problems of managing partitions in a data intensive and cloud based data warehouse with a fixed backup size limit can be relieved by the partition management system 120. Briefly, the partition management system 120 automates and optimizes full data lifecycle management of a cloud based data warehouse, as described in detail below. Moreover, by using the partition management system 120, the database size can exceed the backup size limit, while ensuring that all data is safely backed up.

As noted above, it is desirable to have transaction data stored in separate partitions based on the transaction date. Continuing with the example of FIGS. 3A-C, transaction data for each quarter of a year (e.g., fiscal year) can be stored in its own dedicated partition. Initially, the data for the current quarter is written and read out of the database 300 regularly. But as time passes, older data become used less and it becomes desirable to compress the older data. This is illustrated in FIG. 3C. Later, it becomes desirable to move older data into read-only tablespace 320, which allows the database size to exceed the backup size limit.

At 410, the partition management system 120 can create the initial partitions of database 300 shown in FIG. 3A. These partitions can be created in default tablespace for historical data load, as well as for future data load. Thus, a user's existing history data are initially loaded to RI/ORASE database. Depending on the age of the data, it is initially stored in the read-write tablespaces (DM_FACT_DATA) 317 only or also in the read-only tablespace 320. In an embodiment, transaction date that is older than two quarters from the current date is stored in the read-only tablespaces 320, while all newer transaction data is stored in the read-write tablespaces 310. Also new partitions are created by the partition management system 120 based on the time period appropriate for the user's particular instance.

In an embodiment, the partition management system 120 includes one shell scripts to be called as batch job, one PL/SQL partition management package to be called by shell script to fulfil partition management system 120 functionalities, one PL/SQL API provided with database administrator privileges to performance tablespace level operation, SQL scripts (ddl) for creating system 120 management tables and populate initial values. There is one prerequisite for system 120 to function properly: SQL scripts (ddl) of data definition files should specify as few as one partition with MAXVALUES for each RI/ORASE partitioned tables. There may be in excess of 250 partitioned tables.

In an embodiment, groups of RI/ORASE history and current partitioned tables are categorized into functional modules, such as sales, inventory, price, markdown, etc. Each functional module can be a logical unit for partition management. An individual functional module can be configured on whether it is enabled, what is its future period for partition extension, whether it should be compressed or archived or purged, and what is the partition's retention period. Tables in each enabled functional module can be partitioned, compressed, archived, and purged automatically based on the configuration setting.

In an embodiment, multiple different approaches may be used to categorize RI data tables into functional modules. Under the "naming search pattern approach," most of RI data tables are named based on unified naming standard. Therefore, most of RI data tables can be categorized into modules by key words search which is easily automated and allows the categorization of a large number of tables. Those key words can be stored as MODULE_CODE in configuration tables.

Another categorization approach is the "exact table list approach," where a list of tables is provided for certain MODULE_CODE values, and this approach can handle tables that do not follow standard table naming conventions. The partition management system 120 may use either these approaches in various embodiments.

As shown in FIG. 3A, the C_MODULE_ARTIFACT table 331 may be stored in the database 300 and contains configuration properties for each function module. The configuration properties for each module can include:
  Flag to use search pattern or exact table list for each module
  Flag to enable or disable partition extension
  Grace period for extending future partitions
  Flag to enable or disable compression
  Grace period for compressing inactive data partitions
  Flag to enable or disable archiving/purging of retired history data
  Retention period for history data
  Scheduled day of week for executing automation batch
  Schedule day of month for executing automation batch The database 300 may also, or instead, hold the C_MODULE_EXACT_TABLE (332) which contains the table list for each functional module if the module search method is the exact table list approach noted above.

Figure 4:
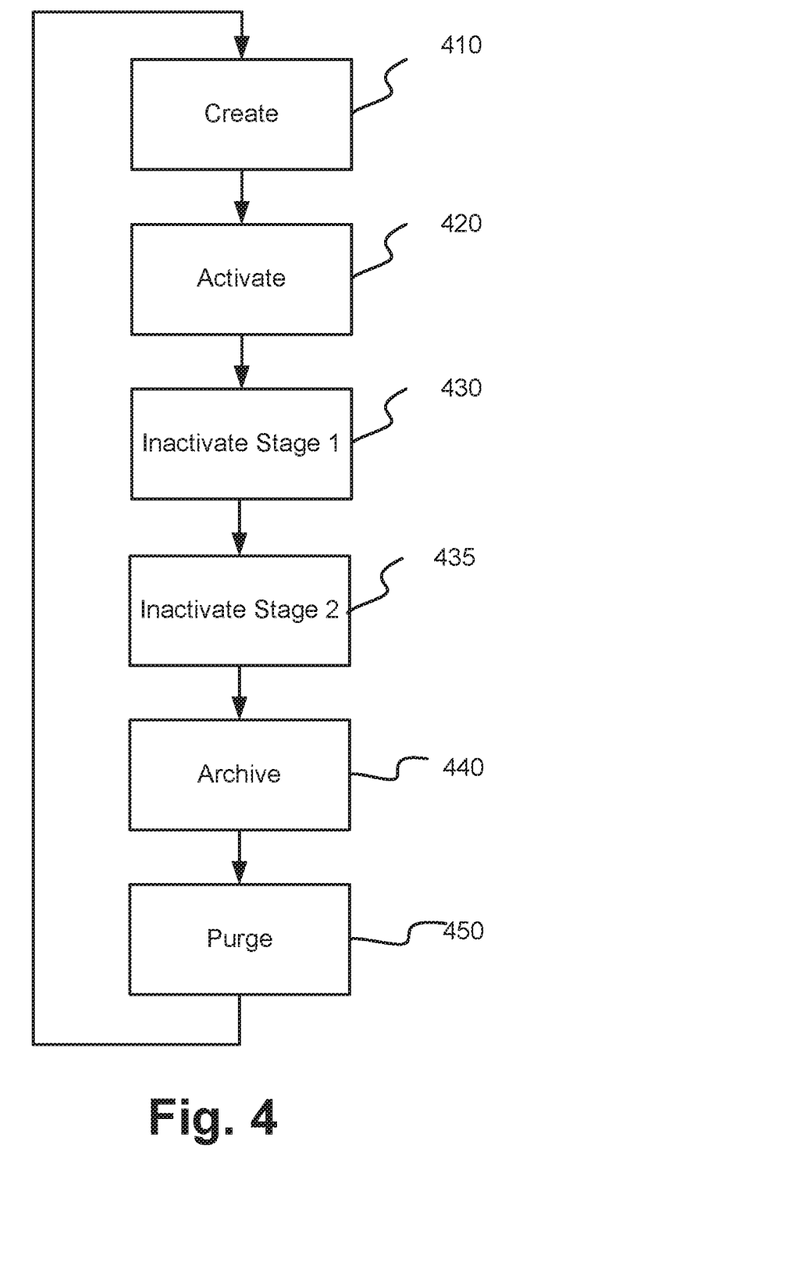
FIG. 4 is a flow diagram of the functionality of the partition management system of FIG. 1 in accordance with an embodiment of the disclosure.

FIG. 4 illustrates a flow diagram of the functionality performed by an embodiment of the partition management system 120. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. A detailed description of the process flow follows after a brief introduction. A detailed description of the process flow follows after a brief introduction.

The creation of partitioned tables as noted above is complicated and difficult to perform manually due to the complication business calendar of RI/ORASE application. Thus, at 410 the partition management system 120 can perform the initial partition creation. The $1^{st}$ predetermined threshold time is configurable to specify how much time the future partitions should be created ahead.

After the initial creation of partitions in 410, the process of FIG. 4 continues to 420, where new partitions are activated. In the embodiment of database 300, the most recent transaction data for a user is grouped by days, weeks or quarters based on the nature of transaction data. Thus, data for one quarter is kept in one or multiple partitions, and when the quarter ends, one quarterly partition or multiple day/week partitions are needed to hold the most recent data, while the prior quarter's data is managed as described below. The activation may include loading data, updating data, and querying the data.

In embodiments, there are hard limits on the time thresholds settings based on user business requirements. Meanwhile, the time thresholds are configurable and dynamic, such that the partition management system detects the total database backup size not counting read-only tablespaces exceeding a threshold of filled capacity, and adjusts the time threshold. In an embodiment, the threshold of filled capacity is 75%, 80%, 85%. Thus, when the system detects that the partition is at, e.g., 75% of its capacity, the system notes how long it took for this situation to occur. This time is a good predictor of configurable time threshold setting, and the time threshold may be updated so that in the future the partition management processes more or less read-only data.

Figure 5:
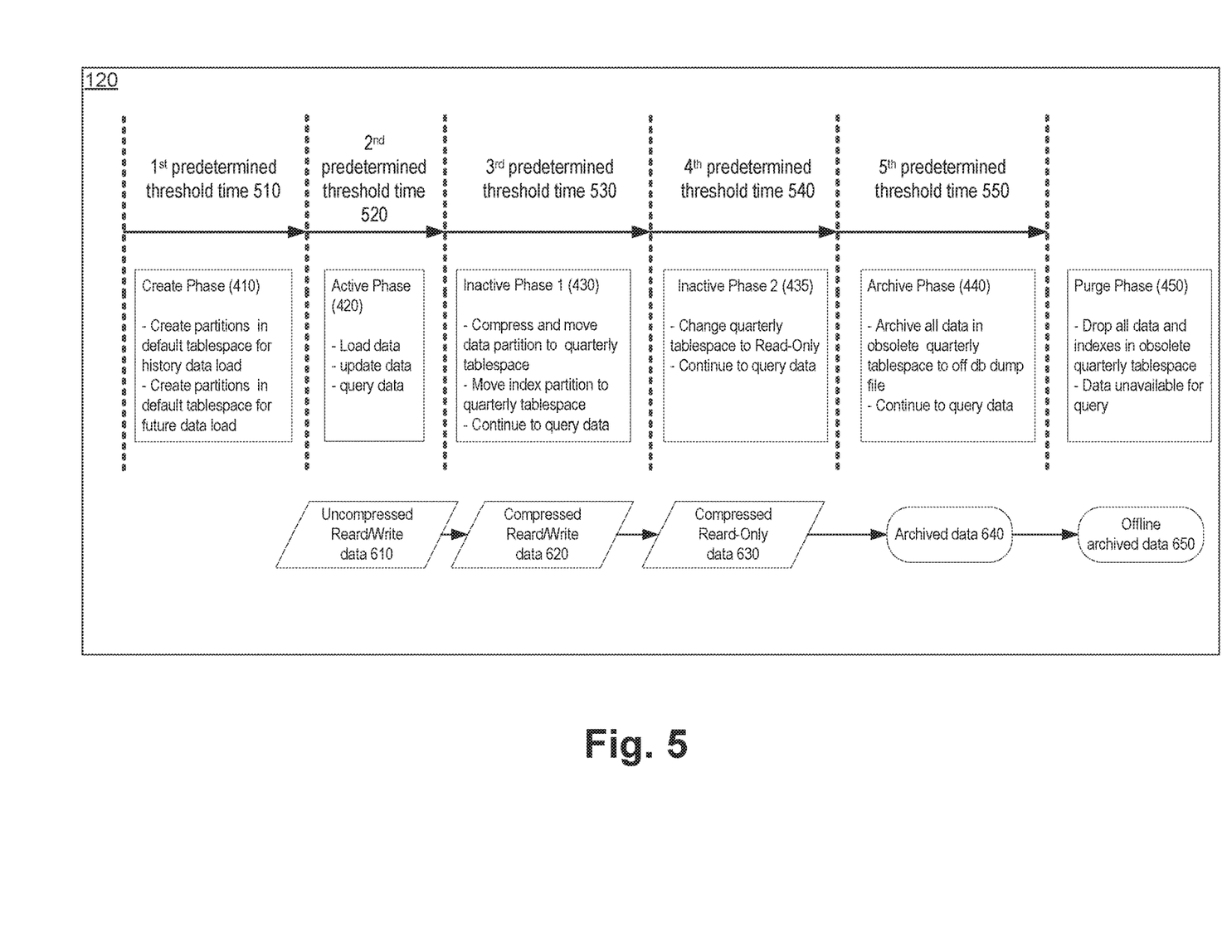
FIG. 5 illustrates timing and data flow control of the partition management system of FIG. 1 in accordance with an embodiment of the disclosure.

Most of fact/aggregation transaction data may become inactive after the data are loaded for 3-6 months. This is specified as $2^{nd}$ predetermined threshold time 520 to specify the threshold time to inactive data. That said, inactive data are still fully accessible for application but they are static now. The data at this stage can be compressed to save disk space. The data can also be marked as read-only, as in 430 below. In an embodiment, when the transaction data is more than 6 months old (or two quarters of time old), the partition storing that data may be compressed, but still retained in the read-write tablespace 310.

At 420, new partitions are activated by the partition management system 120 based on the time period appropriate for the user's particular instance. In an embodiment, new partitions are sized with the minimum expected size and can be auto-extensible up to a maximum size so that the partition can hold the amount of transaction data that will be generated in one quarter (i.e., three months) without wasting space. In this way, as old transaction data becomes less useful, the old data can be inactivated in 430 below, but new partitions are created at the same time to hold the expected amount of new transaction data generated by the user. In an embodiment, when one functional module is enabled for the first time, the same partition automation batch job will extend all required partitions from the current date to future dates based on configurations settings ($1^{st}$ predetermined threshold time 510) without human user input.

Referring still to FIG. 4, at 430, what is referred to as old transaction data above (based on the user's configuration), is subject to inactivation. This can be a two stage process, with stage one at 430 and stage two at 435. In the first stage, a partition holding data corresponding to a $2^{nd}$ predetermined threshold time 520 is compressed and moved to quarterly tablespace. In an embodiment, the partition is DM_FACT_DATA (−2Q) partition 319 in FIG. 3B. Thus, the $2^{nd}$ predetermined threshold here is two quarters, and the transaction data is two quarters old relative to the current date. During the inactivation process, table partition/subpartition compression and movement and index maintenance can be performed together so that data only moves once, improving runtime performance.

In the second stage at 435, when quarterly tablespace contains data with $3^{rd}$ predetermined threshold time 530 has been fully loaded, this quarterly tablespace is changed to read-only attribute (tablespace 320), as shown in FIG. 3A. In an embodiment, the $3^{rd}$ predetermined time threshold is three quarters (or 9 months). Thus, partition management system 120 changes quarterly tablespace DM_FACT_DATA (−3Q) 321 to read-only attribute. It is noted that the data can continue to be queried even after it has been moved to a read-only tablespace.

Referring again to FIG. 4, at 440, data that is older than a $4^{th}$ predetermined time threshold 540 is archived. In an embodiment, this fourth predetermined time threshold is 24 months (or 8 quarters). As shown in FIG. 3C, partition 327 which contains data older than 8 quarters ago is archived in the user's data archive 340. While not shown in FIG. 3C, at some point the partition 327 is present both in read-only tablespace 320 and in the data archive 340. Then, at 450, all the data in archived tablespace 327 and data that is older than $5^{th}$ predetermined time threshold 550 is purged from database 300 entirely. In an embodiment, the data archiving for data older than 24 months can be performed by using a data pump in parallel, to further speed up the transfer from the database 300 to the user's data archive 340. The data 27 months older can be purged.

At 450, all data and indexes in obsolete quarterly tablespace is also dropped, and the data is no longer available to be queried. This is intended, because dropped data will have already been stored in an archive outside of the cloud database.

As already noted, the process in FIG. 4 is executed automatically by the partition management system 120. In an embodiment, the partition management system 120 executes a script on a regular schedule, such as once every week, once every month, or when a trigger is activated in a database table indicating that database is full to a predetermined percentage of total capacity. The predetermined percentage may be 85%, and may be dynamically calculated based on the rate of data filling the partition. In an embodiment, the triggering condition is based on percentage of total database capacity not including read-only tablespaces, such as 75%, 80%, 85%. By relying on the capacity of database before it fills up, the workload intensive steps of partition management system 120 are performed only when needed, such as 430, 435, 440, and 450 in FIG. 4. It reduces the cost of the maintenance operation and reduces the runtime of the partition management system 120.

FIG. 5 illustrates the flow of the above process relative to the time thresholds 510-550, mapped to the condition of the data at the different time thresholds. Initially, data in the active phase 420 is uncompressed read/write data 610. After the $2^{nd}$ predetermined threshold 520, the data is compressed, but is still read/write data 620. After the $3^{rd}$ predetermined threshold 530, the compressed data is changed to read-only, becoming compressed read-only data 630. After the $4^{th}$ predetermined threshold 540, the data is archived into archived data 640. The archived data 640 is still available to be queried. Finally, after the $5^{th}$ predetermined threshold 550, the archived data 640, including all data and indexes, is purged. However, an offline archived data 650 copy may be stored as needed for business or compliance purposes.

Another advantage of moving old transaction data to the read-only tablespace 320 is the ability to increase the size of database 300 beyond the maximum backup size limit. In the cloud environment, an embodiment of the database 300 may have a backup size limit, such as 5 TB. In the absence of moving old data to the read-only table space 320, the backup size limit would also be the database size limit. This is based on the expectation that all data in the database is backed up. Thus, it would not be acceptable to back up only a portion of the database 300.

The backup process is based on timestamps on tablespace. The read-only tablespace 320 has time stamps that do not change. Thus, the backup process correctly recognizes that the data has not changed, and it is not backed up. The data was previously backed up at least once, most likely while the tablespace was just changed to read-only mode tablespace 320. Therefore, the content of the entire database 300 is guaranteed to be backed up, but the repeated backup process, which has a size limitation, does not repeat the backing up of the read-only tablespace 320. Also, compressing inactive data helps to reduce database backup. In an embodiment, the compression ratio is around 2:1. Therefore, the effective size of the database 300 can be greater than the backup size limit, and still guarantee that all data has been backed up.

The above described embodiments kept performance in mind starting from design phase and reduce execution runtime on partition management system 120, because they take into consideration operations that are computationally expensive, and combine their executions, while allowing other operations to proceed. Therefore, partition management system 120 are performed in batches at the end of regular batch window at quieter time, such as every week or every month.

The following operations are computationally expensive and take a relatively long time to complete because data movement is involved:
  Compress table partitions/subpartitions
  Move table partitions/subpartitions to quarterly tablespace
  Move index partitions to quarterly tablespace
  Archive obsolete partition/subpartitions using Oracle data pump (expdp)

In contrast, the following operations are computationally inexpensive and generally take only seconds to complete:
  Extend partitions
  Purge partitions in tablespaces
  Alter quarterly tablespace to read-only
  Drop table partitions
  Drop empty tablespaces The difference in computational cost is accounted for by the process flow of FIG. 4 as explained above, thus reducing the runtime and computational cost of maintaining the partitions in the RI/ORASE database 300 in the cloud environment.

As disclosed, a partition management system enables users to manage a cloud database partition creation, modification, archiving, and purging based on configuration rules automatically and in response to events. The configuration rules may themselves be stored in the database that is being managed, thus providing a self-contained solution Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A partition management system that automatically manages time based on partitions in a cloud hosted database shared among a plurality of users, the system comprising:
    a communication interface configured to bi-directionally communicate with the cloud hosted database and application over a communication network;
    a controller comprising one or more processors executing instructions and configured to issue commands through the communication interface to the cloud hosted database, wherein the commands upon receipt by the cloud hosted database cause the cloud hosted database to:
    create partitions in a first tablespace of the database, the first tablespace comprising physical storage for storing data underlying database objects;
    after a first predetermined threshold time, load uncompressed data in the first tablespace;
    after a second predetermined threshold time that occurs sequentially after the first predetermined threshold time, compress the uncompressed data and move the compressed data to a second tablespace, wherein the second tablespace initially comprises a read write tablespace; and
    after a third predetermined threshold time that occurs sequentially after the first predetermined threshold time and the second predetermined threshold time, change the second tablespace from the read write tablespace to a read-only database.

2. The partition management system according to claim 1, wherein the database objects comprise at least one of a table, an index, a table partition or an index partition.

3. The partition management system according to claim 1, wherein the controller is further configured to issue the commands on either a predetermined regular schedule or when a trigger is activated indicating that the database is filled to a predetermined capacity.

4. The partition management system according to claim 1, further causing the cloud hosted database to:
    after a fourth predetermined time threshold that occurs sequentially after the first predetermined threshold time, the second predetermined threshold time and the third predetermined threshold time, copy all the data in the second tablespace to a data archive external to the cloud hosted database.

5. The partition management system according to claim 4, further causing the cloud hosted database to:
    after a fifth predetermined time threshold that occurs sequentially after the first predetermined threshold time, the second predetermined threshold time, the third predetermined threshold time and the fourth predetermined threshold time, purge all the data from the cloud hosted database.

6. The partition management system according to claim 5, wherein a partition is sized to store an amount of data generated by a user during a predetermined time period.

7. The partition management system according to claim 6, wherein each predetermined threshold time is one business year quarter.

8. The partition management system according to claim 6, further causing the cloud hosted database to:
    detect a condition of the partition; and
    change a value of the first predetermined time threshold based on the detected condition of the partition.

9. A partition management method that automatically manages time based on partitions in a cloud hosted database shared among a plurality of users, the partition management method comprising:
    providing a communication interface configured to bi-directionally communicate with the cloud hosted database and application over a communication network;
    providing a controller configured to issue commands through the communication interface to the cloud hosted database, the commands comprising:
    creating partitions in a first tablespace of the database, the first tablespace comprising physical storage for storing data underlying database objects;
    after a first predetermined threshold time, load uncompressed data in the first tablespace;
    after a second predetermined threshold time that occurs sequentially after the first predetermined threshold time, compress the uncompressed data and move the compressed data to a second tablespace, wherein the second tablespace initially comprises a read write tablespace; and
    after a third predetermined threshold time that occurs sequentially after the first predetermined threshold time and the second predetermined threshold time, change the second tablespace from the read write tablespace to a read-only database.

10. The partition management method according to claim 9, wherein the database objects comprise at least one of a table, an index, a table partition or an index partition.

11. The partition management method according to claim 10, the commands issued on either a predetermined regular schedule or when a trigger is activated indicating that the database is filled to a predetermined capacity.

12. The partition management method according to claim 10, further comprising:
    after a fourth predetermined time threshold that occurs sequentially after the first predetermined threshold time, the second predetermined threshold time and the third predetermined threshold time, copy all the data in the second tablespace to a data archive external to the cloud hosted database.

13. The partition management method according to claim 12, further comprising:
    after a fifth predetermined time threshold that occurs sequentially after the first predetermined threshold time, the second predetermined threshold time, the third predetermined threshold time and the fourth predetermined threshold time, purge all the data from the cloud hosted database.

14. The partition management method according to claim 13, wherein a partition is sized to store an amount of data generated by a user during a predetermined time period.

15. The partition management method according to claim 14, wherein each predetermined threshold time is one business year quarter.

16. The partition management method according to claim 15, further comprising:
    detecting a condition of the partition; and
    changing a value of the first predetermined time threshold based on the detected condition of the partition.

17. A non-transitory computer-readable medium encoded with instructions, wherein the instructions, when executed on one or more processors, configure the processors to automatically manage time based on partitions in a cloud hosted database shared among a plurality of users, the managing comprising:
    opening a communication interface configured to bi-directionally communicate with the cloud hosted database and application over a communication network;

issuing commands by the processor through the communication interface to the cloud hosted database, the commands comprising:

creating partitions in a first tablespace of the database, the first tablespace comprising physical storage for storing data underlying database objects;

after a first predetermined threshold time, load uncompressed data in the first tablespace;

after a second predetermined threshold time that occurs sequentially after the first predetermined threshold time, compress the uncompressed data and move the compressed data to a second tablespace, wherein the second tablespace initially comprises a read write tablespace; and after a third predetermined threshold time that occurs sequentially after the first predetermined threshold time and the second predetermined threshold Urns, change the second tablespace from the read write tablespace to a read-only database.

18. The non-transitory computer-readable medium according to claim 17, the managing further comprising: after a fourth predetermined time threshold that occurs sequentially after the first predetermined threshold time, the second predetermined threshold time and the third predetermined threshold time, copy all the data in the second tablespace to a data archive external to the cloud hosted database.

19. The non-transitory computer-readable medium according to claim 18, the managing further comprising: after a fifth predetermined time threshold that occurs sequentially after the first predetermined threshold time, the second predetermined threshold time, the third predetermined threshold time and the fourth predetermined threshold time, purge all the data from the cloud hosted database.

20. The non-transitory computer-readable medium according to claim 17, wherein a partition is sized to store an amount of data generated by a user during a predetermined time period.

* * * * *

UNITED STATES PATENT AND TRADEMARK OFFICE
CERTIFICATE OF CORRECTION

PATENT NO. : 11,003,651 B2  
APPLICATION NO. : 16/202704  
DATED : May 11, 2021  
INVENTOR(S) : Ge et al.

Page 1 of 1

It is certified that error appears in the above-identified patent and that said Letters Patent is hereby corrected as shown below:

In the Drawings

On sheet 7 of 7, in Fig. 5, under Reference Numeral 610, Line 2, delete "Reard/Write" and insert -- Read/Write --, therefor.

On sheet 7 of 7, in Fig. 5, under Reference Numeral 620, Line 2, delete "Reard/Write" and insert -- Read/Write --, therefor.

On sheet 7 of 7, in Fig. 5, under Reference Numeral 630, Line 2, delete "Reard/Write" and insert -- Read/Write --, therefor.

In the Specification

In Column 10, Line 61, delete "solution" and insert -- solution. --, therefor.

In the Claims

In Column 13, Line 18, in Claim 17, delete "Urns," and insert -- time, --, therefor.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*